(No Model.)

L. A. HILL.
TIRE FOR VELOCIPEDES.

No. 459,363. Patented Sept. 8, 1891.

WITNESSES:
Robt. Aiton.
L. Danville.

INVENTOR
Louis A. Hill.
BY
ATTORNEY.

UNITED STATES PATENT OFFICE.

LOUIS A. HILL, OF PHILADELPHIA, PENNSYLVANIA, ASSIGNOR OF ONE-HALF TO LEON H. GILBERT, OF SAME PLACE.

TIRE FOR VELOCIPEDES.

SPECIFICATION forming part of Letters Patent No. 459,363, dated September 8, 1891.

Application filed August 26, 1890. Serial No. 363,099. (No model.)

*To all whom it may concern:*

Be it known that I, LOUIS A. HILL, a citizen of the United States, residing in the city and county of Philadelphia, State of Pennsylvania, have invented a new and useful Improvement in Tires for Velocipedes, &c., which improvement is fully set forth in the following specification and accompanying drawings.

My invention consists of a tire for a velocipede embodying novel features, as follows: a tire formed of elastic material provided with a distending band or ring on the inner face of the outer periphery thereof; also, a tire of elastic material provided with a band or ring on the inner face of the inner periphery of the tire; also, a tire of elastic material with a narrow tread and broad inner periphery, and rims or rings within the tire, and, finally, means for securing the band of the inner periphery to the same.

Figure 1:
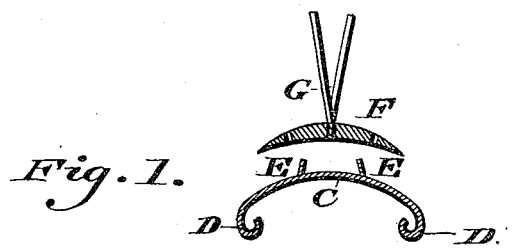
Figure 2:
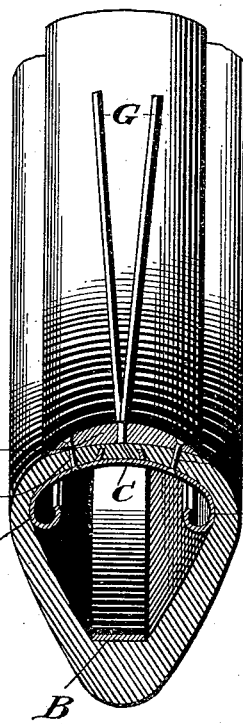

Figure 1 represents a sectional view of detached portions of a tire embodying my invention. Fig. 2 represents a transverse section of the tire.

Similar letters of reference indicate corresponding parts in the two figures.

Referring to the drawings, A designates the tire proper, the same being composed of a hollow or tubular piece of soft rubber somewhat ovoid in cross-section. Within the tire, on the inner face of the outer periphery thereof, is a band or ring B, of steel or other suitable metal, which forms an interior rim, serving to stiffen said periphery without materially affecting the elasticity thereof.

On the inner face of the inner periphery of the tire is a band or ring C, of steel or other suitable metal, curved in cross-section, forming an interior rim, which serves to stiffen said periphery. The sides of the band are bent inwardly, as at D, thus adding to the strength of the band and avoiding the presentation of sharp edges to the tire and guarding the sides from injurious action of blows. The face of the band or rim C is provided with spurs E, which enter the inner periphery of the tire, serving to connect said parts and preventing shifting of the same on each other.

On the outer face of the inner periphery of the tire is a metallic ring or band F, which forms the felly, connected with which are the spokes G of the wheel, of which the tire constitutes a portion. The ends or tenons of said spokes also pass through the band F and are riveted or otherwise firmly connected therewith, the rim, felly, and tire being furthermore connected by rivets H, it being seen that the inner periphery of the tire is clamped between said rim and felly, thus providing a rigid connection of the parts and a consequent strong structure, it being noticed that the tire possesses great resiliency, for while it is braced and stiffened internally by the rims B C it is similarly affected outwardly by the felly F. Furthermore, the tire is prevented from closing, owing to the rim B, the sides of the tire being left free to expand and contract, while the outer periphery presents an elastic cushion or rim, which adds to the ease of riding and renders the wheel comparatively noiseless, it being noticed that the tread is narrow while the inner periphery is broad, so as to produce a large surface for attachment of the spoke-holding devices.

Having thus described my invention, what I claim as new, and desire to secure by Letters Patent, is—

1. An elastic tire of tubular form, having an internal rim on the inner periphery thereof provided with spurs which enter the tire, substantially as described.

2. An elastic tire of tubular form, having a narrow tread provided with an internal rim on the inner periphery thereof and sides forming guards, said parts being combined substantially as described.

3. An elastic tubular tire provided with a narrow tread and a broader inner periphery, and a narrow outer rim internally located on the tire and a broader inner rim within the tire, substantially as described.

4. In combination with a wheel-felly, a hollow rubber tire secured thereon and a metal band seated within the outer part of the tire, substantially as described.

LOUIS A. HILL.

Witnesses:
JOHN A. WIEDERSHEIM,
A. P. JENNINGS.